United States Patent
Hawener et al.

(10) Patent No.: US 6,196,564 B1
(45) Date of Patent: Mar. 6, 2001

(54) WHEEL SUSPENSION FOR A MOTOR VEHICLE

(75) Inventors: Rainer Hawener, Tiefenbronn; Andreas Kluge, Renningen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/327,629

(22) Filed: Jun. 8, 1999

(30) Foreign Application Priority Data

Jun. 8, 1998 (DE) .............................................. 198 25 569
Jun. 23, 1998 (DE) .............................................. 198 27 864

(51) Int. Cl.$^7$ ................................................. B60G 11/56
(52) U.S. Cl. ............................. 280/124.162; 280/124.179
(58) Field of Search ...................... 280/124.179, 124.162

(56) References Cited

U.S. PATENT DOCUMENTS

| | | | |
|---|---|---|---|
| 3,486,763 | * 12/1969 | Hexel | 280/124.179 |
| 3,727,939 | 4/1973 | Mykolenko | 280/124 R |
| 3,781,033 | * 12/1973 | Buchwald | 280/124.179 |
| 3,901,494 | * 8/1975 | Sena | 280/124.179 |
| 4,143,888 | 3/1979 | Heinig | 280/697 |
| 4,465,300 | * 8/1984 | Raidel, Sr. | 280/124.179 |
| 4,690,428 | 9/1987 | Fluegge | 280/697 |
| 4,989,894 | 2/1991 | Winsor et al. | 280/690 |

FOREIGN PATENT DOCUMENTS

| | | |
|---|---|---|
| 938 891 | 7/1949 | (DE) . |
| 28 54 269 | 7/1979 | (DE) . |
| 0 015 015 | 9/1980 | (EP) . |

\* cited by examiner

*Primary Examiner*—Kenneth R. Rice
(74) *Attorney, Agent, or Firm*—Evenson, McKeown, Edwards & Lenahan, P.L.L.C.

(57) ABSTRACT

A wheel suspension for a motor vehicle, particularly a rear wheel suspension, has a spring which is arranged separately from a shock absorber. The spring and the shock absorber are supported at their lower ends, by way of a common console arranged approximately transversely to the vehicle, on a longitudinal rear axle tube. An upper end of the shock absorber is swivellably held on a carrying device fastened to a vehicle body member. An upper end of the spring is disposed in a supporting device integrated in the vehicle body member.

8 Claims, 5 Drawing Sheets

WHEEL SUSPENSION FOR A MOTOR VEHICLE

BACKGROUND AND SUMMARY OF THE INVENTION

This application claims the priority of German patent application 198 25 569.1, filed Jun. 8, 1998 and German patent application 198 27 864.0 filed Jun. 23, 1998, the disclosures of which are expressly incorporated by reference herein.

The invention relates to a wheel suspension for a motor vehicle, particularly a rear wheel suspension, having a spring arranged separately from a shock absorber.

From U.S. Pat. No. 3,727,939, a wheel suspension for a motor vehicle is known, in which a spiral spring is arranged separately in relation to a shock absorber with respect to the longitudinal direction of the vehicle. The supporting with respect to the vehicle body as well as to the vehicle suspension takes place by individual bearings which have a high-expenditure design.

It is an object of the invention to provide a wheel suspension, particularly a rear wheel suspension, with improved bearings for a shock absorber and a spiral spring, which is arranged separately thereto, which are easy to mount, and which wheel suspension permits an exterior position of the shock absorber with respect to the wheel.

According to the invention, this object has been achieved by providing a wheel suspension for a motor vehicle, comprising: a shock absorber; a spring arranged separately from said shock absorber; a console to be arranged approximately in a transverse vehicle direction on a longitudinal rear axle tube, said console supporting a lower end of said shock absorber and supporting a lower end of said spring; a carrying device coupled to a vehicle body member, an upper end of said shock absorber being swivellably coupled to said carrying device; and a supporting device coupled to said vehicle body member, an upper end of said spring being disposed on said supporting device.

According to the invention, this object has been achieved by providing an arrangement for supporting a spring and a shock absorber arranged separately from each other in a motor vehicle wheel suspension, comprising: a pot-shaped member coupled to a vehicle body member such that said pot-shaped member is open in a downward direction, said pot-shaped member including a bearing area to be coupled to an upper end of the spring; a U-shaped profile coupled to at least one of said vehicle body member and said pot-shaped member such that said U-shaped profile extends at least approximately vertically, said U-shaped bearing to be coupled to an upper end of the shock absorber.

The principal advantages achieved by the invention are that a simple lower bearing for the spiral spring as well as for the shock absorber is formed by a common transversely arranged console which is connected, for example, by welding, with a longitudinal rear axle tube. The upper bearings for the shock absorber and the spiral spring are constructed separately. The upper bearing for the shock absorber comprises a carrying device attached on the outside to the vehicle body member. The shock absorber is arranged between the rear wheel and the longitudinal rear axle tube of the wheel suspension; that is, the distance between the shock absorbers of each wheel side, as a whole, has a relatively large base. Furthermore, the upper bearing of the shock absorber is provided at a vertical distance to the upper bearing of the spiral spring.

The spiral spring is arranged approximately in parallel to the shock absorber in the transverse direction of the vehicle.

An upper end of the spiral spring is held in a supporting device which is integrated in the vehicle body member. In addition to a spring plate for the spiral spring, this supporting device also comprises an additional inner spring as a stop element in order to absorb a deflection.

Adjacent to this supporting device, the carrying device for the upper end of the shock absorber is provided on the exterior side of the vehicle body member. The carrying device extends above the supporting device so that the bearing of the shock absorber is at a vertical distance from the supporting device. Due to the exterior arrangement of the shock absorber at a relatively large distance, an improved roll damping is achieved.

The common bearing console for the shock absorber and the spiral spring can be connected in a simple manner with the longitudinal rear axle tube, for example, by welding. Through a recess or shaping-out, the upper spring plate of the supporting device for the spiral spring can be connected with the vehicle body member, so that a simple preassembly of the wheel suspension unit is permitted. In particular, the spring plate can be connected with a pot which extends inside the vehicle body member and protrudes as a so-called dome. On the top side, the carrying device for the shock absorber can then be connected with this dome.

Other objects, advantages and novel features of the present invention will become apparent from the following detailed description of the invention when considered in conjunction with the accompanying drawings.

DETAILED DESCRIPTION OF THE DRAWINGS

Figure 1:
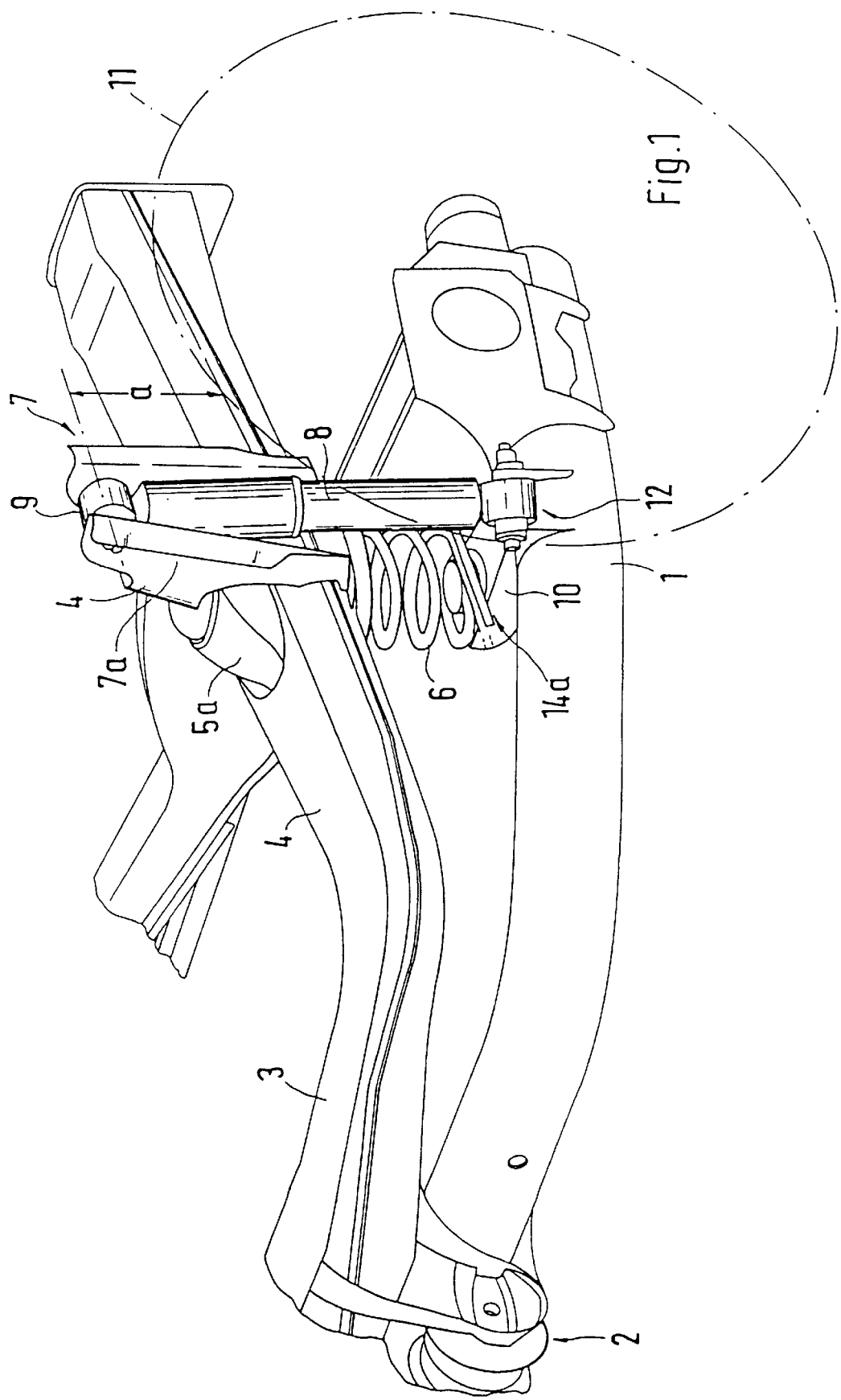
FIG. 1 is a perspective view of a rear wheel suspension with a shock absorber arranged separately from a spiral spring according to a preferred embodiment of the present invention.
Figure 2:
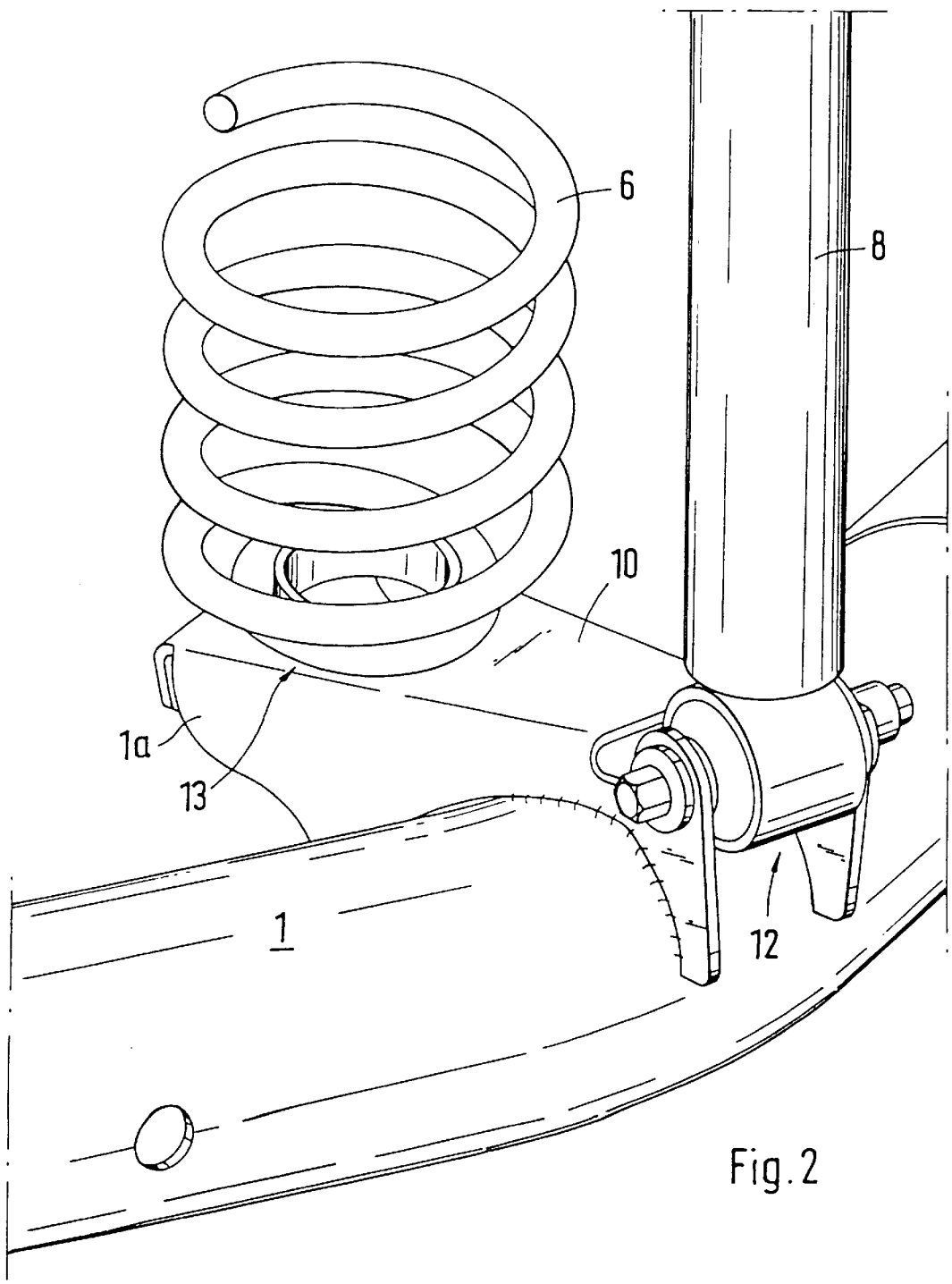
FIG. 2 is an enlarged perspective view of the console for the lower bearing of the shock absorber and the spiral spring.
Figure 3:
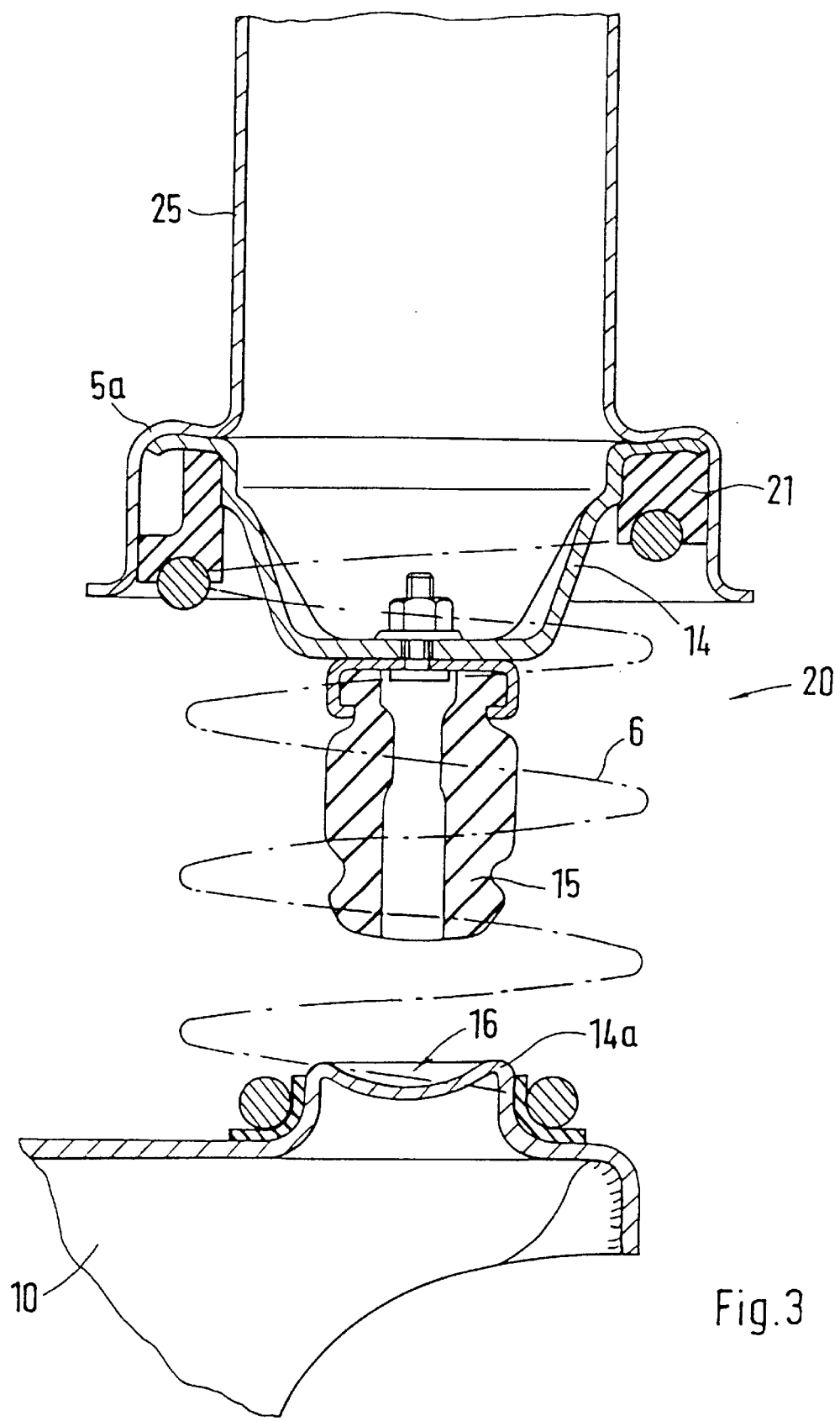
FIG. 3 is a sectional view of the supporting device for the spiral spring in the vehicle body member.
Figure 4:
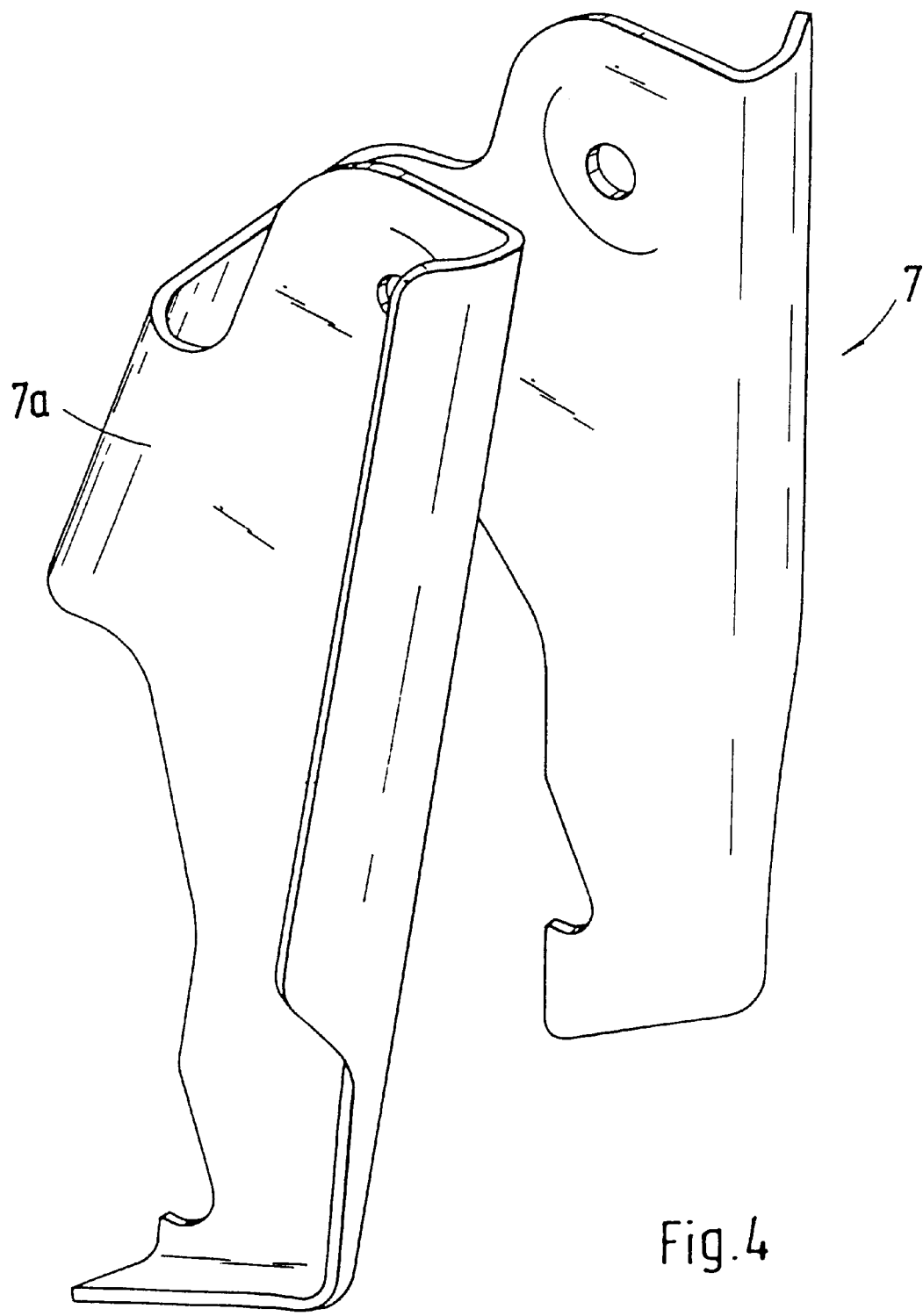
FIG. 4 is an enlarged perspective view of the carrying device for the shock absorber.
Figure 5:
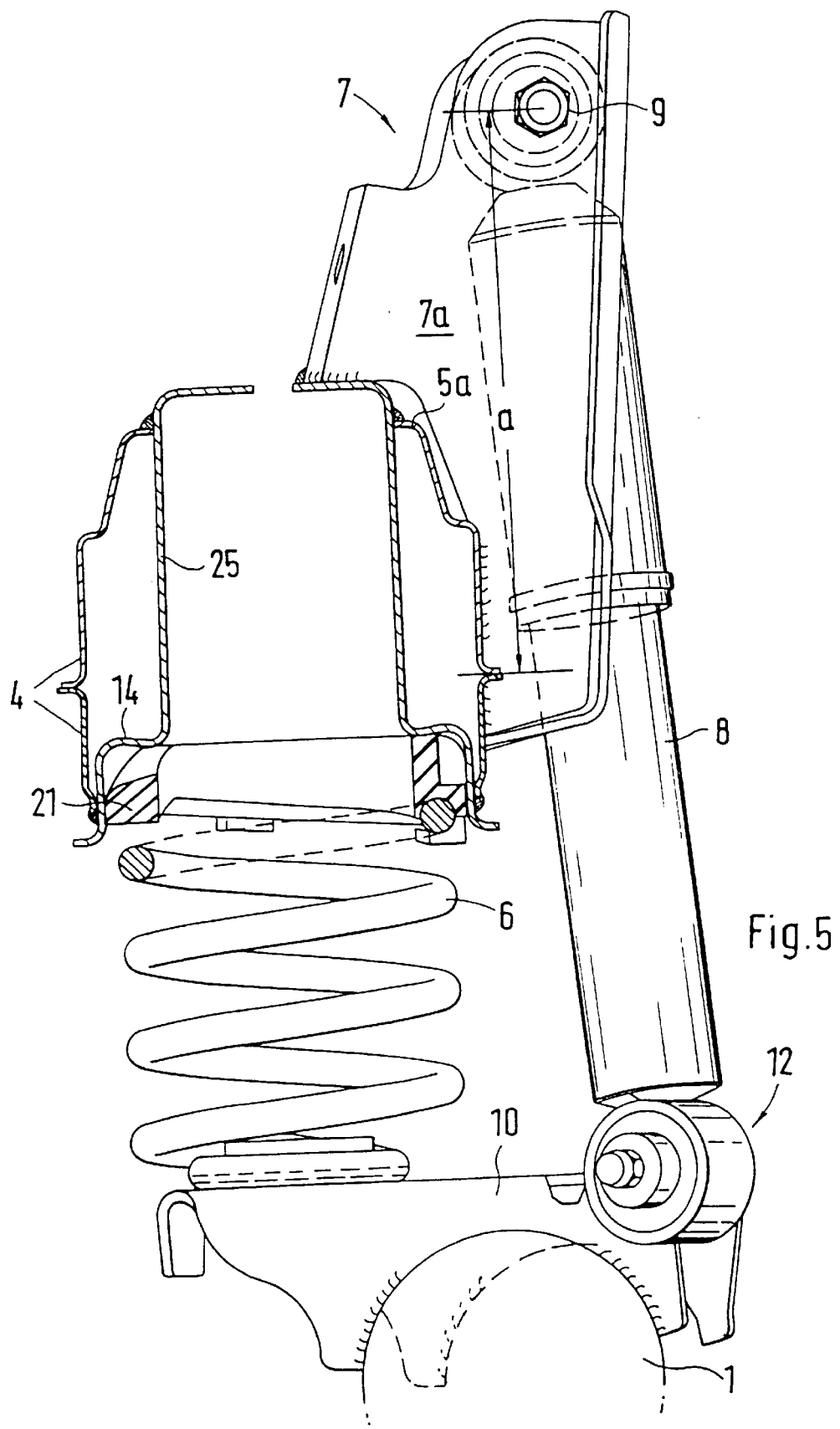
FIG. 5 is a sectional view of the transversely arranged console for the shock absorber and the spiral spring as well as an upper spring plate for the spiral spring and the carrying device for the shock absorber.

The wheel suspension comprises essentially a U-shaped rear axle tube 1 which is connected with a vehicle body cross member 3 via a central bearing 2. By way of a carrying device 7, a shock absorber 8 is supported, by way of an upper bearing 9, on a side member 4 of this vehicle body cross member 3. By way of a supporting device 5a of the vehicle body member 3, an upper end of a spring 6 is supported by way of an element 21 in a spring plate 14.

The lower end of the shock absorber 8 and the lower end 13 of the spiral spring 6 are supported and disposed in a common, transversely aligned console 10. The spring 6 and the shock absorber 8 are arranged approximately in parallel to one another in the transverse direction of the vehicle, the spring 6—with respect to the vehicle wheel 11.

The console 10 consists of a shaped sheet metal part of an approximately U-profile-shaped cross-section which, by way of its side 1a, is placed onto the top side of the longitudinal rear axle tube 1 and is welded thereto. The console 10 extends transversely to the inside to the longitudinal wheel center plane and, in the area of the tube 1, has a lower bearing 12 for the shock absorber 8. Adjacent to this bearing 12, the spring 6 is disposed by way of a spring plate 14a.

Opposite the console 10, a supporting device 20 is arranged which is integrated in the vehicle body member 4. The supporting device 20 comprises a spring plate 14 which is inserted in a recess or a shaping-out of the vehicle body member 4. The supporting device further comprises, for example, a pot 25 which forms a dome 5a. This dome 5a and pot 25 project out of the vehicle body member 4. The spring plate 14 has an elastic supporting element 15 which is arranged concentrically with respect to the spiral spring 6 and which is situated opposite the lower spring plate 14a and can be supported, for example, on a concave surface 16.

The carrying device 7 for the shock absorber 8 comprises an approximately U-profile-shaped oblong upward-projecting profile 7a which is connected on the exterior side of the vehicle body member 4 by welding. The profile 7a is connected in one or more areas with the dome 5a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel suspension for a motor vehicle, comprising:
    a shock absorber;
    a spring arranged separately from said shock absorber;
    a console to be arranged on a U-shaped, longitudinal, rear axle tube, said console extending transversely with respect to a longitudinal center plane of said wheel, supporting a lower end of said shock absorber, and supporting a lower end of said spring;
    a carrying device coupled to a vehicle body member, an upper end of said shock absorber being swivellably coupled to said carrying device; and
    a supporting device coupled to said vehicle body member, an upper end of said spring being disposed on said supporting device.

2. Wheel suspension according to claim 1, wherein the shock absorber and the spring are arranged side-by-side in parallel approximately in the transverse vehicle direction, with the spring being arranged on the inside with respect to a vehicle wheel.

3. Wheel suspension according to claim 1, wherein said console comprises an arm extending in a freely projecting manner from the longitudinal rear axle tube toward inside, said console further comprising a bearing for supporting said spring on said arm and a bearing for supporting said shock absorber proximate the longitudinal rear axle tube.

4. Wheel suspension according to claim 1, wherein said carrying device comprises a U-shaped, upright profile which is connected with the vehicle body member and is partially supported on a dome in the vehicle body member, at least one of said shock absorber and a bearing for the shock absorber being received between legs of said profile.

5. Wheel suspension according claim 1, wherein said supporting device for the spring has an upper spring plate held in a shaping-out of said vehicle body member, said upper spring plate being opposed by a lower spring plate in said console.

6. Wheel suspension according to claim 5, wherein said upper spring plate has an elastic supporting element connected thereto and arranged coaxially inside the spring, and wherein said elastic supporting element can be supported by said lower spring plate.

7. Wheel suspension according to claim 5, wherein said upper spring plate for the spring comprises a pot which forms a dome, said upper spring plate being inserted in a penetrating manner in the vehicle body member and being connected therewith.

8. An arrangement for supporting a spring and a shock absorber arranged separately from each other in a motor vehicle wheel suspension, comprising:
    a pot-shaped member coupled to a vehicle body member such that said pot-shaped member is open in a downward direction, said pot-shaped member including a bearing area to be coupled to an upper end of the spring;
    a U-shaped profile coupled to at least one of said vehicle body member and said pot-shaped member such that said U-shaped profile extends at least approximately vertically, said U-shaped profile to be coupled to an upper end of the shock absorber; and
    a console to be arranged on a U-shaped, longitudinal, rear axle tube, said console extending transversely with respect to a longitudinal center plane of said wheel, supporting a lower end of said shock absorber, and supporting a lower end of said spring.

* * * * *